(12) United States Patent
Black et al.

(10) Patent No.: US 9,766,328 B2
(45) Date of Patent: Sep. 19, 2017

(54) SONAR TRANSDUCER ARRAY ASSEMBLY AND METHODS OF MANUFACTURE THEREOF

(71) Applicant: Garmin Switzerland GmbH, Schaffhausen (CH)

(72) Inventors: Brandon M. Black, Tulsa, OK (US); Brian T. Maguire, Bixby, OK (US); John A. Matson, Broken Arrow, OK (US)

(73) Assignee: Garmin Switzerland GmbH (CH)

( * ) Notice: Subject to any disclaimer, the term of this patent is extended or adjusted under 35 U.S.C. 154(b) by 209 days.

(21) Appl. No.: 14/604,347

(22) Filed: Jan. 23, 2015

(65) Prior Publication Data

US 2016/0018514 A1 Jan. 21, 2016

Related U.S. Application Data (60) Provisional application No. 62/024,833, filed on Jul. 15, 2014, provisional application No. 62/024,843, (Continued)

(51) Int. Cl.
*G01S 7/526* (2006.01)
*G01S 7/521* (2006.01)
(Continued)

(52) U.S. Cl.
CPC ........... *G01S 7/526* (2013.01); *B06B 1/0622* (2013.01); *G01S 7/521* (2013.01); *G01S 7/52003* (2013.01);
(Continued)

(58) Field of Classification Search
CPC ...................................................... H01L 41/08
See application file for complete search history.

(56) References Cited

U.S. PATENT DOCUMENTS

| 2,861,320 A | 11/1958 | Gravley | 25/25.35 |
| 3,952,387 A | 4/1976 | Itamura | 29/25.25 |

(Continued)

FOREIGN PATENT DOCUMENTS

WO WO2009010583 1/2009

OTHER PUBLICATIONS

International Search Report and Written Opinion for corresponding PCT/US2015/030868 dated Jul. 31, 2015.
(Continued)

*Primary Examiner* — Hovhannes Baghdasaryan
(74) *Attorney, Agent, or Firm* — Samuel M. Korte; Max M. Ali (57) ABSTRACT

A sonar transducer array assembly comprises a first flexible circuit, a second flexible circuit, and a plurality of transducer elements. The first and second flexible circuits each include a first side, a second side, and a plurality of adhesive areas spaced apart and positioned in a line along one edge of the first side. The transducer elements each include a first surface attached to one of the adhesive areas of the first flexible circuit, an opposing second surface attached to one of the adhesive areas of the second flexible circuit, and a third surface positioned between the first and second surfaces. The transducer elements form a linear array with the third surface of each transducer element in alignment and configured to transmit and receive an acoustic pressure wave.

29 Claims, 5 Drawing Sheets

Related U.S. Application Data filed on Jul. 15, 2014, provisional application No. 62/024,823, filed on Jul. 15, 2014.

(51) Int. Cl.

| | |
|---|---|
| *G01S 7/62* | (2006.01) |
| *G01S 15/89* | (2006.01) |
| *G01S 7/60* | (2006.01) |
| *G10K 11/00* | (2006.01) |
| *B06B 1/06* | (2006.01) |
| *G01S 7/52* | (2006.01) |
| *G01S 15/06* | (2006.01) |
| *G10K 11/34* | (2006.01) |

(52) U.S. Cl.
CPC .............. *G01S 7/60* (2013.01); *G01S 7/6245* (2013.01); *G01S 7/6263* (2013.01); *G01S 7/6272* (2013.01); *G01S 7/6281* (2013.01); *G01S 15/06* (2013.01); *G01S 15/89* (2013.01); *G01S 15/8902* (2013.01); *G10K 11/004* (2013.01); *G10K 11/006* (2013.01); *G10K 11/34* (2013.01)

(56) References Cited

U.S. PATENT DOCUMENTS

| | | | |
|---|---|---|---|
| 4,217,684 A | 8/1980 | Brisken et al. | 29/25.35 |
| 4,370,785 A | 2/1983 | Assenza et al. | 29/25.35 |
| 4,385,255 A | 5/1983 | Yamaguchi et al. | 310/335 |
| 4,404,489 A | 9/1983 | Larson, III et al. | 310/334 |
| 4,406,967 A | 9/1983 | Obara et al. | 310/366 |
| 4,411,052 A | 10/1983 | Kampf | 29/25.35 |
| 4,683,396 A | 7/1987 | Takeuchi et al. | 310/358 |
| 4,701,659 A | 10/1987 | Fujii et al. | 310/334 |
| 4,734,963 A | 4/1988 | Ishiyama | 29/25.35 |
| 4,747,192 A | 5/1988 | Rokurota | 29/25.35 |
| 4,773,140 A | 9/1988 | McAusland | 29/25.35 |
| 4,803,392 A | 2/1989 | Kushida et al. | 310/311 |
| 5,051,799 A | 9/1991 | Paul et al. | 375/25 |
| 5,275,167 A | 1/1994 | Killam | 128/662.03 |
| 5,537,380 A | 7/1996 | Sprankle, Jr. et al. | 369/291 |
| 5,655,276 A | 8/1997 | Pattanayak et al. | 29/25.35 |
| 5,730,113 A | 3/1998 | Wildes et al. | 125/13.01 |
| 5,792,058 A | 8/1998 | Lee et al. | 600/459 |
| 5,920,523 A | 7/1999 | Hanafy et al. | 367/140 |
| 5,920,972 A | 7/1999 | Palczewska et al. | 29/25.35 |
| 5,931,684 A | 8/1999 | Obendorf et al. | 439/67 |
| 6,043,590 A | 3/2000 | Gilmore | 310/367 |
| 6,100,626 A | 8/2000 | Frey et al. | 310/334 |
| 6,110,314 A | 8/2000 | Nix et al. | 156/218 |
| 6,198,692 B1 | 3/2001 | Sekine | 367/11 |
| 6,263,551 B1 | 7/2001 | Lorraine et al. | 29/25.35 |
| 6,445,646 B1 | 9/2002 | Handa et al. | 367/105 |
| 6,541,896 B1 | 4/2003 | Piel, Jr. et al. | 310/334 |
| 6,775,388 B1 | 8/2004 | Pompei | 381/191 |
| 6,894,425 B1 | 5/2005 | Solomon et al. | 310/334 |
| 7,035,166 B2 | 4/2006 | Zimmerman et al. | 367/88 |
| 7,105,986 B2 * | 9/2006 | Wildes | A61B 8/546 310/327 |
| 7,123,546 B2 | 10/2006 | Zimmerman et al. | 367/103 |
| 7,173,879 B2 | 2/2007 | Zimmerman et al. | 367/103 |
| 7,355,924 B2 | 4/2008 | Zimmerman et al. | 367/88 |
| 7,508,737 B1 | 3/2009 | Alexandru | 367/103 |
| 7,846,101 B2 | 12/2010 | Eberle et al. | 600/459 |
| 8,008,842 B2 | 8/2011 | Jiang et al. | 310/334 |
| 2002/0134422 A1 * | 9/2002 | Bauman | H01L 31/048 136/244 |
| 2004/0095045 A1 * | 5/2004 | Baumgartner | B06B 1/06 310/365 |
| 2005/0036404 A1 | 2/2005 | Zhu et al. | 367/88 |
| 2006/0058676 A1 * | 3/2006 | Yagi | A61B 8/12 600/459 |
| 2006/0191344 A1 * | 8/2006 | Hashimoto | A61B 8/00 73/632 |
| 2007/0070814 A1 | 3/2007 | Frodyma et al. | 367/134 |
| 2007/0093715 A1 | 4/2007 | Hippe et al. | 600/437 |
| 2008/0192575 A1 | 8/2008 | Coleman | 367/115 |
| 2010/0103775 A1 | 4/2010 | Betts et al. | 345/168 |
| 2011/0202278 A1 | 8/2011 | Caute et al. | 702/14 |
| 2011/0299630 A1 | 12/2011 | Petrovic | 375/340 |
| 2013/0107487 A1 | 5/2013 | Wodnicki et al. | 361/784 |
| 2014/0350407 A1 * | 11/2014 | Chaggares | B06B 1/0622 600/459 |

OTHER PUBLICATIONS

International Search Report and Written Opinion for corresponding PCT/US2015/030871 dated Aug. 27, 2015.
SeaBeam Multibeam Operation, published 2000.
Wassp WMB160F Multi-Beam Fishing System Display Modes (published 2007).
How Wassp Works, published 2012.
Wassp Navigator brochure, published 2012.
Wassp 2013 Brochure, published 2013.
U.S. Appl. No. 14/604,266, filed Jan. 23, 2015.
U.S. Appl. No. 14/604,321, filed Jan. 23, 2015.
U.S. Appl. No. 14/604,335, filed Jan. 23, 2015.
U.S. Appl. No. 14/604,242, filed Jan. 23, 2015.
International Search Report and Written Opinion for corresponding PCT/US2015/030866 dated Jan. 6, 2016.

\* cited by examiner

SONAR TRANSDUCER ARRAY ASSEMBLY AND METHODS OF MANUFACTURE THEREOF

RELATED APPLICATION

The current non-provisional patent application claims priority benefit, with regard to all common subject matter, of earlier-filed U.S. provisional patent applications entitled "MARINE SONAR DISPLAY DEVICE", Application Ser. No. 62/024,833, filed Jul. 15, 2014; "MARINE MULTI-BEAM SONAR DEVICE," Application Ser. No. 62/024,843, filed Jul. 15, 2014; and "A SONAR TRANSDUCER ARRAY ASSEMBLY AND METHODS OF MANUFACTURE THEREOF", Application Ser. No. 62/024,823, filed Jul. 15, 2014. The earlier-filed applications are hereby incorporated by reference into the current application in their entirety.

BACKGROUND

Sound navigation and ranging (sonar) transducer arrays typically include a plurality of transducer elements that can be configured to transmit a steerable sonar beam or receive a steerable sonar beam. The transducer elements are positioned in a linear array with spacing between the elements.

SUMMARY

Embodiments of the present technology provide a sonar transducer array assembly for transmitting and/or receiving sonar beams. The sonar transducer array assembly comprises a first flexible circuit, a second flexible circuit, and a plurality of transducer elements. The first and second flexible circuits each include a first side, a second side, and a plurality of adhesive areas spaced apart and positioned in a line along one edge of the first side. The transducer elements each include a first surface attached to one of the adhesive areas of the first flexible circuit, an opposing second surface attached to one of the adhesive areas of the second flexible circuit, and a third surface positioned between the first and second surfaces. The transducer elements form a linear array with the third surface of each transducer element in alignment and configured to transmit and receive an acoustic pressure wave.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to sonar transducer array assemblies. Sonar transducer array assemblies typically include a plurality of transducer elements that are positioned in a linear array with spacing between the elements. One or more assemblies are utilized to form a sonar element in a multibeam phased array sonar system. Multibeam sonar systems traditionally have not been developed for the consumer market. The sonar element is often packaged in a housing that is large in size and may require multiple people to install it on a marine vessel.

Embodiments of the present technology provide a sonar transducer array assembly that includes an array of transducer elements which are connected to first and second flexible circuits. The flexible circuits can be bent or shaped to fit into smaller and lower profile housings so that a sonar element which includes the sonar transducer array assembly can be handled more easily.

Figure 1:
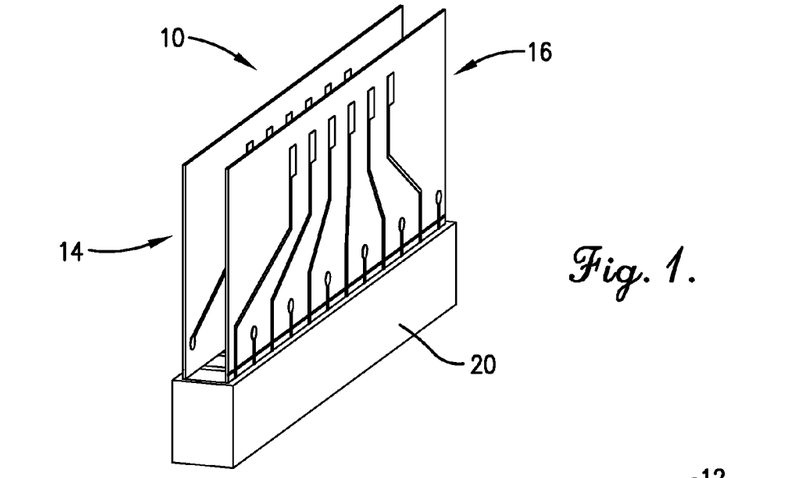
FIG. 1 is a perspective view of a sonar transducer array assembly constructed in accordance with various embodiments of the current technology.

Embodiments of the technology will now be described in more detail with reference to the drawing figures. Referring initially to FIG. 1, a sonar transducer array assembly 10 is illustrated. The transducer array assembly 10 broadly comprises a plurality of transducer elements 12, a first flexible (flex) circuit 14, a second flex circuit 16, a plurality of spacers 18, and an insulating sleeve 20 for providing mechanical and/or acoustical isolation.

Figure 2:
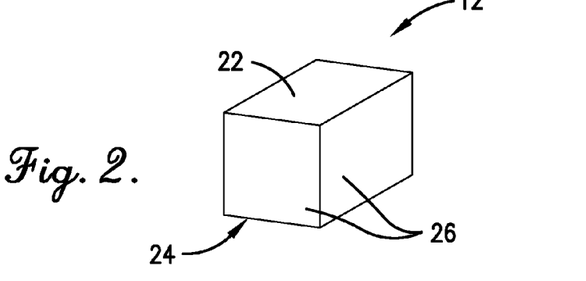
FIG. 2 is a perspective view of a transducer element utilized with the sonar transducer array assembly.

Each transducer element 12 may be formed from piezoelectric materials like ceramics such as lead zirconate titanate (PZT) or polymers such as polyvinylidene difluoride (PVDF). Each transducer element 12, as seen in FIG. 2, may have a rectangular box shape with a top face 22, a bottom face 24, and four side faces 26. In various embodiments, the top face 22 and the bottom face 24 may each have a metallic coating applied thereto. In exemplary embodiments, the top face 22 and the bottom face 24 may each be silver plated.

The transducer element 12 may function as an acoustic (pressure) wave receiver or an acoustic wave transmitter. In the acoustic wave receiver mode, when any of the side faces 26 are impinged by acoustic waves generating a force or pressure thereon, the transducer element 12 may develop a voltage between the top face 22 and the bottom face 24 corresponding in magnitude and frequency to the impinging acoustic waves. In the acoustic wave transmitter mode, when a periodic voltage is applied between the top face 22 and the bottom face 24, the transducer element 12 may generate pressure, acoustical, mechanical, and/or vibrational waves from the side faces 26 corresponding in magnitude and frequency to the periodic voltage.

The first flex circuit 14, also known as a flexible printed circuit (FPC), may include one or more sheets of flexible film with one or more conductive layers. The flexible film may be considered a base layer and may be formed from polymer materials such as polyimide (PI), polyester (PET), polyethylene napthalate (PEN), polyetherimide (PEI), along with various fluoropolymers (FEP) and copolymers, or the like. The flexible film may present nearly any shape and may have a thickness ranging from approximately 12 micrometers (μm) to approximately 125 μm. The conductive layer may be formed from conductive materials such as copper, gold, aluminum, nickel, silver, alloys thereof, or the like. The conductive layer may be laminated to one side or surface of the flexible film and is typically covered with a flexible insulator. If two conductive layers are included, then a first conductive layer may be laminated to one side of the flexible film, while a second conductive layer may be laminated to the other side of the flexible film, with each conductive layer being covered with a flexible insulator.

The first flex circuit 14, as seen in FIGS. 1 and 3A-9, may include a first side 28, an opposing second side 30, a plurality of adhesive areas 32, a plurality of pads 34, a plurality of vias 36, a plurality of traces 38, and a stiffener 40. The adhesive areas 32 may be formed with bonding agents that attach one object to another and may be positioned on the first side 28, the second side 30, or both. In configurations, the adhesive areas 32 may comprise a continuous sheet of adhesive with a plurality of holes cut therein. In other configurations, the adhesive areas 32 may comprise a plurality of individual pads. The pads 34 may be formed from the conductive layer and may be positioned on the first side 28, the second side 30, or both. The pads 34 may provide electrical connection to a connector that connects to another system or device and communicates electronic signals to and from the transducer elements 12. In some embodiments, the pads 34 may provide electrical connection to optional electrical or electronic components, such as amplifier circuits or signal processor circuits.

The vias 36 may connect from the first side 28 to the second side 30 and may be plated with an electrically conductive material, such as copper, that also forms a ring around the circumference of the hole. The traces 38 may be formed from the conductive layer and may be positioned on the first side 28, the second side 30, or both. The traces 38 may provide electrical connection from pads 34 and vias 36 to other pads 34 and vias 36. The stiffener 40 may include a sheet of flexible film with a similar or greater rigidity as compared with the base layer. Instead of the vias 36 described throughout the present disclosure, through holes (plated and/or non-plated) may be used to connect the various elements of the transducer element 12. In configurations, combinations of vias and through holes may be used as the vias 36.

Figure 3A:
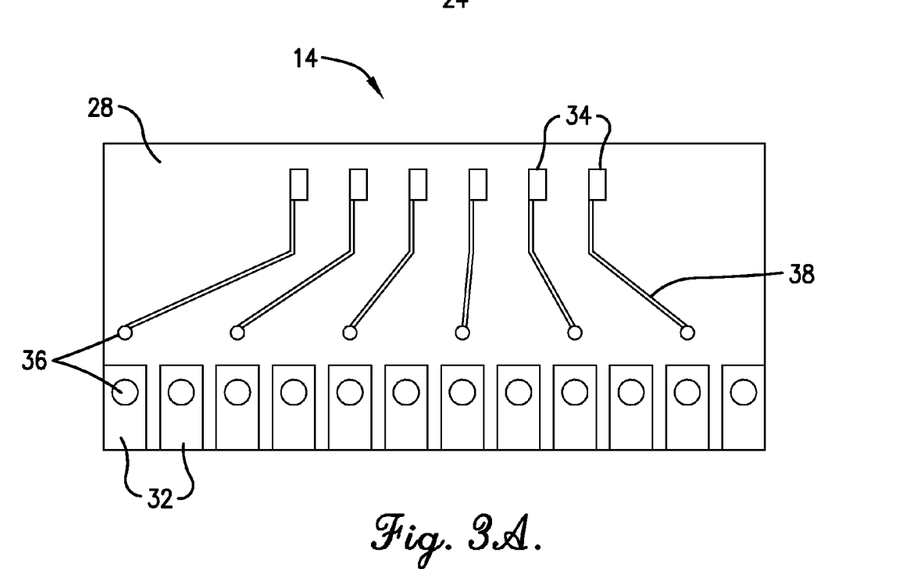
FIG. 3A is a top view of a first side of a flexible circuit utilized with the sonar transducer array assembly.
Figure 3B:
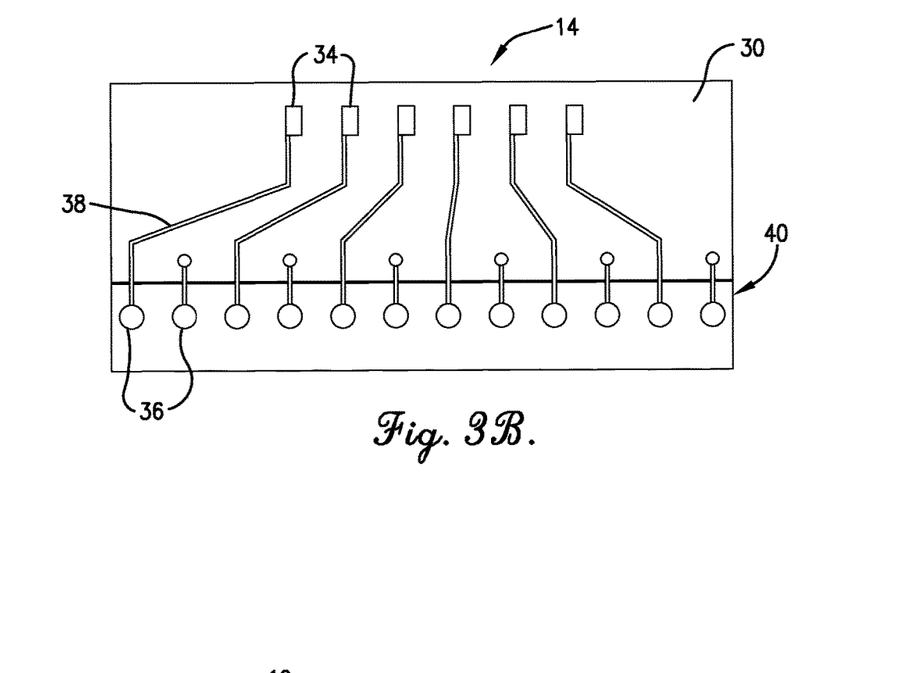
FIG. 3B is a top view of a second side of the flexible circuit utilized with the sonar transducer array assembly.
Figure 4:
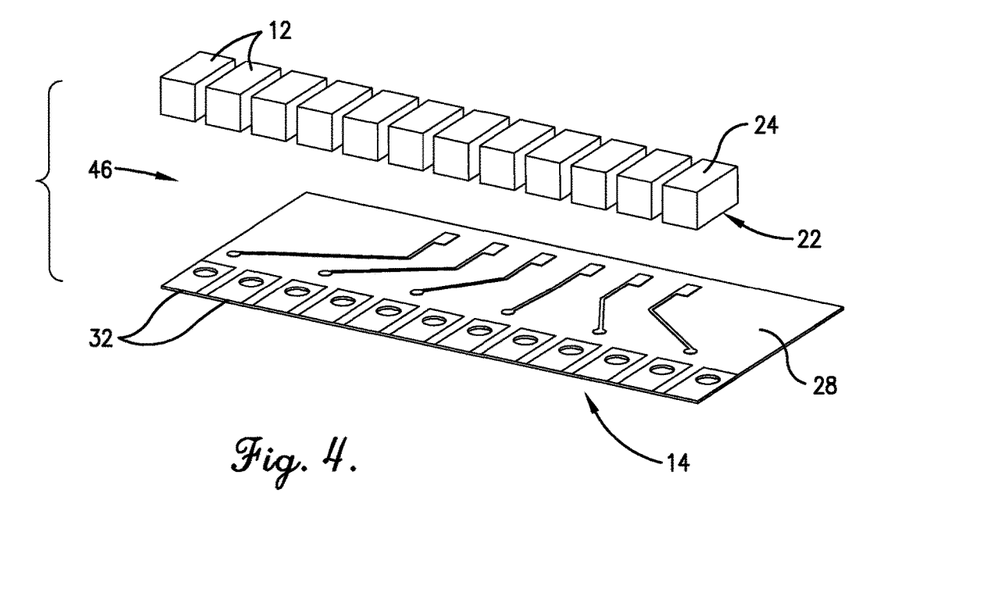
FIG. 4 is a perspective view of a transducer array and a first flexible circuit.

In an exemplary embodiment, the first side 28 may be configured to receive the transducer elements 12 and may include one adhesive area 32 for each of the transducer elements 12 of the transducer array 46, as shown in FIG. 3A. The adhesive areas 32 are generally shaped to match the shape of the top face 22 or the bottom face 24 and may be distributed in a line along one edge of the first flex circuit 14. In addition, the adhesive areas 32 may be spaced apart from one another with the spacing being determined by, or related to, a wavelength of the waves transmitted and received by the transducer elements 12. In configurations, adhesive areas 32 may comprise a continuous strip of adhesive with a plurality of holes cut or otherwise formed therein. In other configurations, the adhesive areas 32 included a plurality of individual pads. Furthermore, one via 36 is positioned within each adhesive area 32. Traces 38 on the second side 30 connect the vias 36 to pads 34 for communication with external devices or to pads 34 with optional electronic circuits. The stiffener 40 may be attached to the second side 30, as shown in FIG. 3B, with adhesive and may be aligned with the adhesive areas 32 on the first side 28 at the edge of the first flex circuit 14. The stiffener 40 may also include a plurality of holes that are aligned with the row of vias 36.

The second flex circuit 16, as seen in FIGS. 1 and 6-9, may be substantially similar and in some embodiments identical, in size, shape, electrical configuration, and/or mechanical configuration to the first flex circuit 14 and may include a first side 42 and a second side 44, as well as adhesive areas 32, pads 34, vias 36, traces 38, and the stiffener 40. The adhesive areas 32 may be positioned on the first side 42 to align with the adhesive areas 32 on the first side 28 of the first flex circuit 14. The second flex circuit 16 may also include one via 36 positioned within each adhesive area 32. The stiffener 40, with a plurality of holes, may be attached to the second side 44, in a similar fashion to that of the first flex circuit 14. The layout of the pads 34, other vias 36, and the traces 38 may be similar to that of the first flex circuit 14 or may be different. In addition, the second flex circuit 16 may include optional electronic circuitry. In various embodiments, the electronic circuitry of the second flex circuit 16 is the same or substantially similar to the electronic circuitry of the first flex circuit 14.

Figure 9:
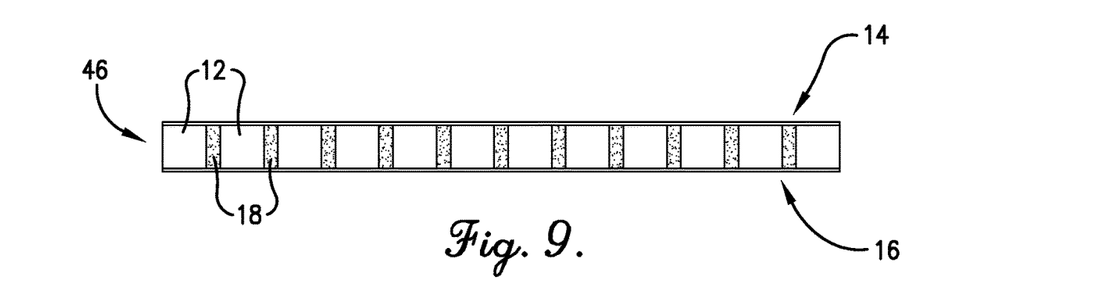
FIG. 9 is a bottom view of the sonar transducer array assembly depicting a plurality of spacers, with one spacer positioned between each adjacent pair of transducer elements.

The spacers 18, as seen in FIG. 9, may be formed from materials that are resilient and reduce or dampen movement, such as soft urethane or expanding urethane foam. The spacers 18 may hold the transducer elements 12 in position in the sonar transducer array assembly 10 and may be sized to fit between adjacent transducer elements 12. In configurations, the spacers 18 may be discrete mechanical or physical elements. In other configurations, the spacers 18 may be spaces, gaps, or air pockets filled with urethane, foam, or other similar materials. In some configurations, spacers 18 may be air gaps positioned between the transducer elements 12 lacking filler materials.

The insulating sleeve 20, as seen in FIG. 1, may be formed from material, such as synthetic rubbers (e.g., neoprene foam), cork, corprene, vinyl, polyurethane, other foams, combinations thereof, and the like, that can isolate mechanical energy, vibrations, and/or acoustical energy. An exemplary insulating sleeve 20 may be formed from neoprene. The insulating sleeve 20 may be flexible and have a tubular or cylindrical shape with a circumference that is proportional to the width of the first flex circuit 14 and the second flex circuit 16. The insulating sleeve 20 may have a height approximately equal to the height of the stiffener 40.

Figure 5:
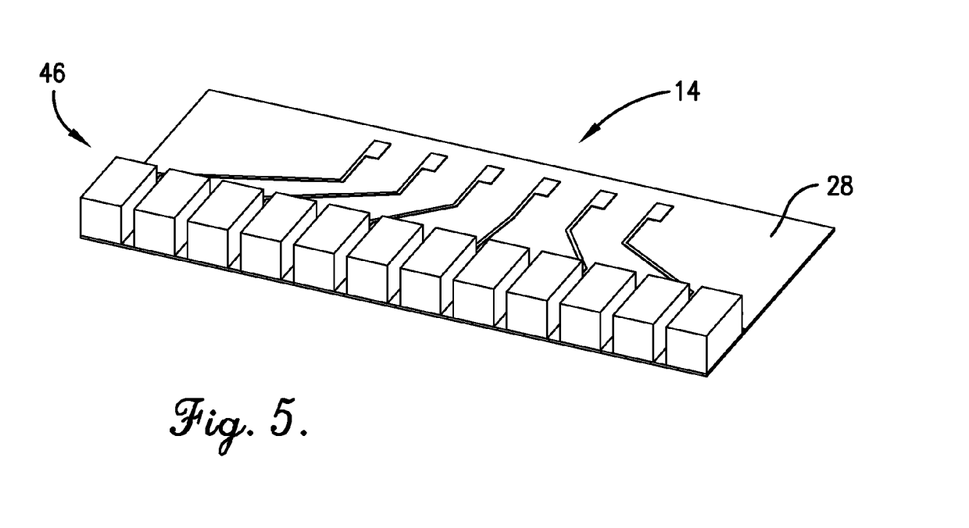
FIG. 5 is a perspective view of the transducer array attached to the first flexible circuit.
Figure 6:
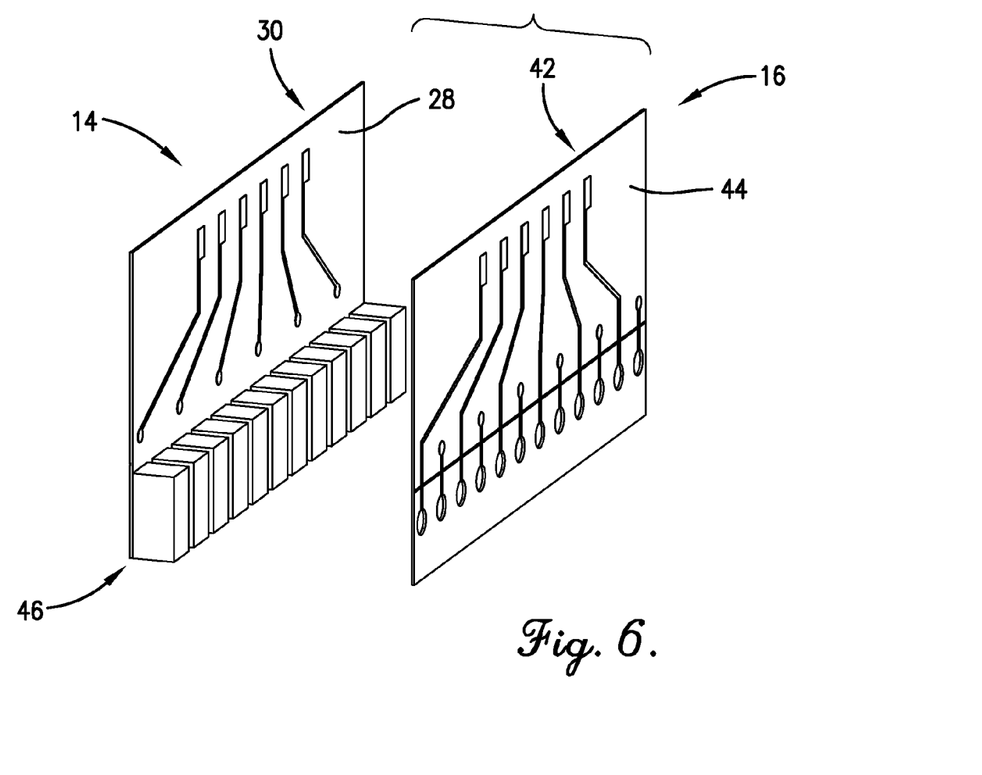
FIG. 6 is a perspective view of the transducer array, the first flexible circuit, and a second flexible circuit.
Figures 7, 8:
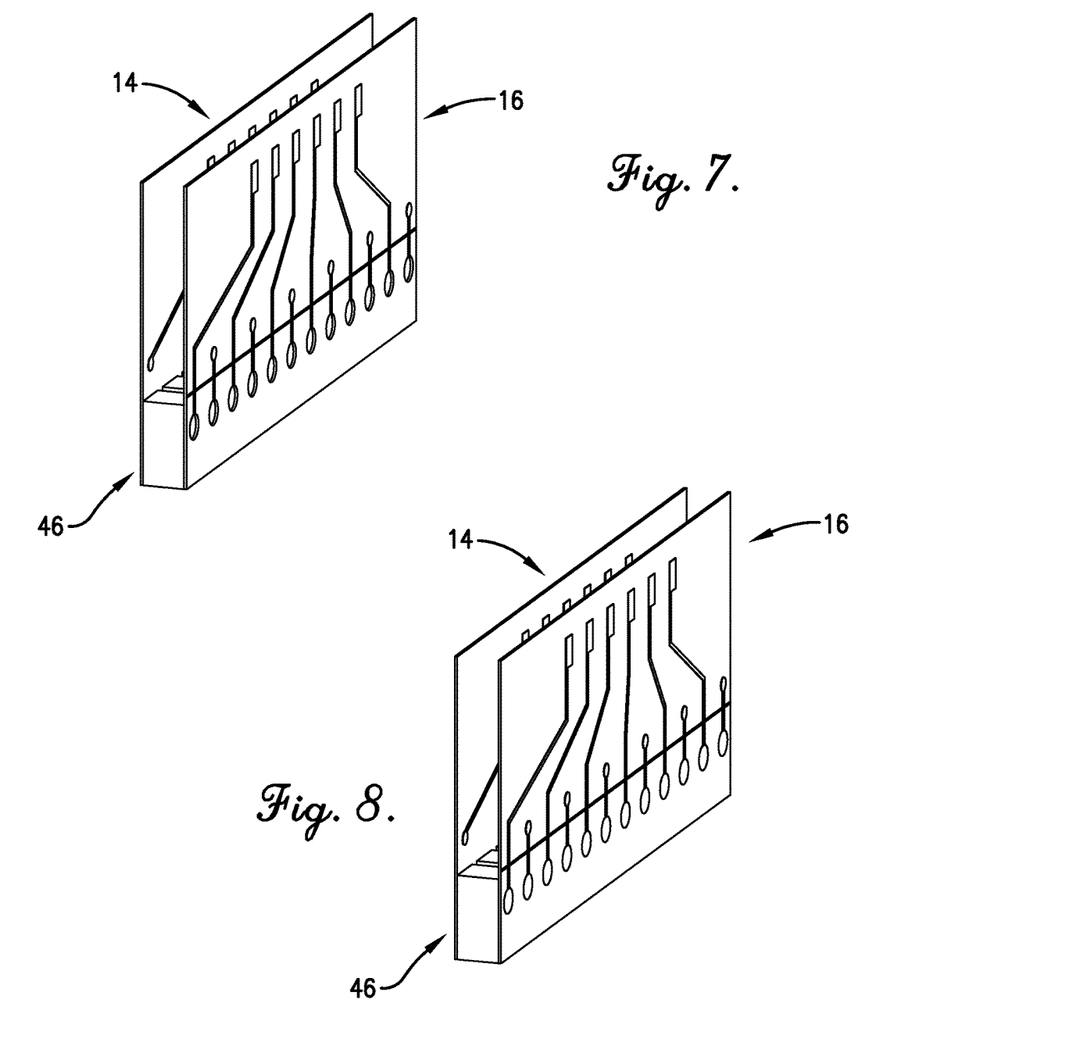
FIG. 7 is a perspective view of the transducer array attached to both the first flexible circuit and the second flexible circuit.
FIG. 8 is a perspective view of the sonar transducer array assembly depicting an electrical connection between the transducer array and the second flexible circuit.

The sonar transducer array assembly 10 may have the following construction. The transducer elements 12 may be positioned to form a linear array 46, with spacing therebetween being determined by, or related to, a wavelength of the waves transmitted and received by the transducer elements 12. The transducer array 46 may be positioned on and attached to the adhesive areas 32 of the first side 28 of the first flex circuit 14 such that the top face 22 of each transducer element 12 contacts one adhesive area 32, as shown in FIGS. 5 and 6. Each transducer element 12 may be electrically connected to the via 36 positioned within each adhesive area 32. The electrical connection may be made with conductive epoxy paste or tin-lead solder, as shown in FIG. 8. In configurations, the adhesive areas 32 function as a gasket to prevent the conductive epoxy from shorting the adjacent channels. The second flex circuit 16 may be attached to the transducer array 46 such that each adhesive area 32 of the first side 42 may contact the bottom face 24 of one transducer element 12. In addition, each transducer element 12 may be electrically connected to the via 36 positioned within each adhesive area 32 of the second flex circuit 16.

In one configuration, the length of each flex circuit 14, 16 is about approximately 1.5 to 2.5 inches, the height of each flex circuit is about approximately 0.25 to 1.0 inches, the length of the transducer array 46 is approximately about 1.5 to 2.5 inches, and the gap between each transducer element 12 in the array 46 is approximately 0.05 to 0.10 inches. Thus, embodiments of the present invention provide a compact transducer array assembly 10. However, the assembly 10 may present configurations and dimensions of any size.

The spacers 18 may be positioned within the transducer array 46 such that one spacer 18 is positioned between each pair of adjacent transducer elements 12, as shown in FIG. 9. The insulating sleeve 20 may be positioned around a lower portion of the first flex circuit 14 and the second flex circuit 16 such that it covers the stiffener 40 on each flex circuit 14, 16 and the opposing ends of the transducer array 46, as shown in FIG. 1.

During operation of the sonar transducer array assembly 10, the insulating sleeve 20 mechanically and/or acoustically isolates the exposed portion of the transducer array 46 and prevents, or at least reduces, acoustic energy from being transferred to other areas of the assembly 10. The sleeve 20 may be configured to envelope, encapsulate, and/or at least partially surround one or more of the transducer elements 12 to provide for acoustic decoupling and/or isolation.

Typically, the sonar transducer array assembly 10 is configured as a transmitting array that transmits a steerable sonar beam or a receiving array that receives a steerable sonar beam. The sonar transducer array assembly 10 is usually paired with a second sonar transducer array assembly which performs the complementary function to form a sonar element. The two sonar transducer array assemblies 10 may couple with sonar equipment that sends electronic signals to and receives electronic signals from the assemblies 10. The sonar equipment may calculate sonar data and generate sonar imagery based on the electronic signals received from the sonar transducer array assemblies 10.

Figure 10:
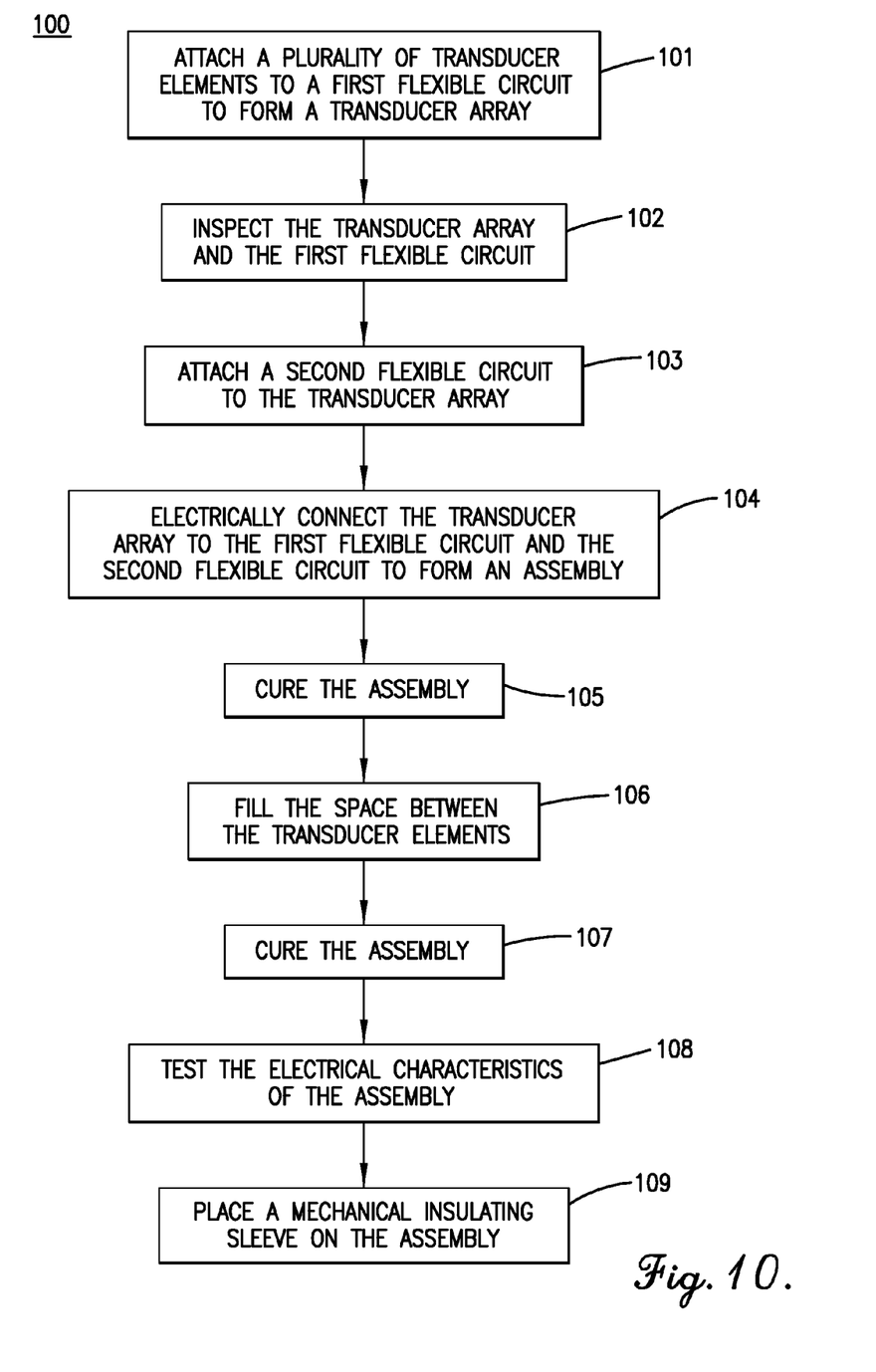
FIG. 10 is a flow diagram listing at least a portion of the steps of a method of manufacturing a sonar transducer array assembly.

At least a portion of the steps of a method 100, in accordance with various aspects of the current technology, of manufacturing a sonar transducer array assembly 10 is listed in FIG. 10. The steps of the method 100 may be performed in the order as shown in FIG. 10, or they may be performed in a different order. Furthermore, some steps may be performed concurrently as opposed to sequentially. In addition, some steps may not be performed.

Referring to step 101, a plurality of transducer elements 12 is attached to a first flexible (flex) circuit 14, as shown in FIGS. 5 and 6. Each transducer element 12 may be formed from piezoelectric materials and may have a rectangular box shape with a top face 22, a bottom face 24, and four side faces 26, as seen in FIG. 2. The first flex circuit 14 may include a first side 28, an opposing second side 30, a plurality of adhesive areas 32, a plurality of pads 34, a plurality of vias 36, and a plurality of traces 38.

The transducer elements 12 and the first flex circuit may be prepared in advance. The top face 22 and the bottom face 24 of every transducer element 12 may each be coated with a metal, such as silver. Referring to FIGS. 3A and 3B, the adhesive areas 32 may be distributed in a line along one edge of the first side 28 of the first flex circuit 14, with each adhesive area 32 shaped to match the shape of the top face 22 or the bottom face 24. The first flex circuit 14 may include one adhesive area 32 for each transducer element 12. In addition, the first flex circuit 14 may include one via 36 positioned within each adhesive area 32. Furthermore, the first flex circuit 14 may include traces 38 and pads 34 laid out as needed.

The transducer elements 12 may be placed on the first flex circuit 14 in an automated fashion, such as by robotic pick and place, or in a manual fashion. The transducer elements 12 may be placed on the first flex circuit 14 such that the top face 22 of each transducer element 12 contacts one adhesive area 32 on the first side 28 of the first flex circuit 14. The transducer elements 12 then stick to the first flex circuit 14, as shown in FIGS. 5 and 6. Furthermore, the transducer elements 12 placed in a linear arrangement with space between each element 12 forms a transducer array 46.

Referring to step 102, the transducer elements 12 and the first flex circuit 14 are inspected. The inspection is a visual inspection to check that the transducer elements 12 are placed on the first flex circuit 14 with the proper orientation, alignment, and spacing therebetween. The inspection may be performed as an automated optical inspection. If any errors are found, then one or more of the transducer elements 12 may be replaced on the first flex circuit 14.

Referring to step 103, a second flex circuit 16 is attached to the transducer array 46, as shown in FIG. 7. The second flex circuit 16 may be substantially similar, and in some configurations identical, to the first flex circuit 14 and may include a first side 42, an opposing second side 44, a plurality of adhesive areas 32, and a plurality of vias 36. The second flex circuit 16 may be prepared in advance such that the adhesive areas 32 are distributed in a line along one edge of the first side 42 of the second flex circuit 16, with each adhesive area 32 shaped to match the shape of the top face 22 or the bottom face 24. The second flex circuit 16 may include one adhesive area 32 for each transducer element 12 and one via 36 positioned within each adhesive area 32. In addition, the adhesive areas 32 are positioned to align with the adhesive areas 32 on the first flex circuit 14. Furthermore, the first flex circuit 14 may include traces 38 and pads 34 laid out as needed.

The second flex circuit 16 may be oriented such that the first side 42 faces the first side 28 of the first flex circuit 14, as shown in FIG. 6. The second flex circuit 16 may be pressed onto the transducer array 46 such that each adhesive area 32 contacts the bottom face 24 of each transducer element 12. At this point, the sonar transducer array assembly 10 may include the transducer array 46 attached to the first sides 28, 42 of both the first flex circuit 14 and the second flex circuit 16.

Referring to step 104, the transducer array 46 is electrically connected to the first flex circuit 14 and the second flex circuit 16. The transducer array 46 may be accessible along the second sides 30, 42 of both the first flex circuit 14 and the second flex circuit 16 through vias 36 that are aligned with the transducer elements 12. Thus, the top face 22 of each transducer element 12 may be electrically connected to one via 36 of the first flex circuit 14. And, the bottom face 24 of each transducer element 12 may be electrically connected to one via 36 of the second flex circuit 16. The electrical connection may be made through the use of conductive epoxy paste which is applied to the vias 36 such that the hole of the via 36 is filled with the paste, as shown in the exemplary embodiment in FIG. 8. Screening components may be utilized when filling the vias 36 with the paste. The electrical connection may also be made with tin-lead solder wherein the transducer elements 12 are soldered to the vias 36. The combination of a single transducer element 12 along with the vias 36, traces 38, and pads 34 on both flex circuits 14, 16 to which the transducer element 12 is connected may form a channel.

Referring to step 105, the sonar transducer array assembly 10 is cured at an elevated temperature sufficient to cure electrical bonds. Referring to step 106, the space between the transducer elements 12 is filled. The space between the transducer elements 12, also known as the kerf, may be filled with a plurality of spacers 18, such that one spacer 18 is positioned between each two adjacent transducer elements 12, as shown in FIG. 9. The spacers 18 may be formed from urethane, such as a soft urethane or an expanding urethane foam. The spacers 18 may be created and positioned by applying (e.g., spraying, filling, and the like) a urethane foam onto the transducer array 46 such that the foam covers the entire array 46. In other configurations, a backing, comprising an acoustic isolation foam and/or other dampening material, is positioned between the flex circuits 14, 16. In embodiments, a single polymer piezoelectric transducer array with pre-filled kerfs may be employed. In such embodiments, the single polymer assembly may be pressed and adhered to the adhesive areas 32 of the corresponding transducer element 12.

Referring to step 107, the sonar transducer array assembly 10 is cured again at an elevated temperature sufficient to cure the filler.

Referring to step 108, the electrical characteristics of the sonar transducer array assembly 10 are tested. The electrical characteristics may include inductance, capacitance, and resistance, also known as LCR. The testing may involve probing a pad 34 on the first flex circuit 14 and a pad 34 on the second flex circuit 16, wherein the two pads 34 form the endpoint of one channel. The inductance, capacitance, and resistance between these two points may be measured. Alternatively or in addition, two other points, such as intermediate test points, may be probed along the path of a channel, and the inductance, capacitance, and resistance may be measured. This testing may determine open circuits, short circuits, and impedances.

Referring to step 109, an insulating sleeve 20 is placed on the sonar transducer array assembly 10. The insulating sleeve 20 may be formed from synthetic rubbers, such as neoprene, and may have a tubular or cylindrical shape. The insulating sleeve 20 may be placed around the sonar transducer array assembly 10 so that it covers a lower portion of the second sides 30, 44 of the first flex circuit 14 and the second flex circuit 16 as well as the opposing ends of the transducer array 46, as shown in FIG. 1.

Although the technology has been described with reference to the embodiments illustrated in the attached drawing figures, it is noted that equivalents may be employed and substitutions made herein without departing from the scope of the technology.

What is claimed is:

1. A sonar transducer array assembly comprising:
   a first flexible circuit including a first side, a second side, and a plurality of adhesive areas spaced apart and positioned in a line along one edge of the first side;
   a second flexible circuit including a first side, a second side, and a plurality of adhesive areas spaced apart and positioned in a line along one edge of the first side;
   a plurality of transducer elements, each transducer element including a first surface attached to one of the adhesive areas of the first flexible circuit, an opposing second surface attached to one of the adhesive areas of the second flexible circuit, and a third surface configured to transmit and receive an acoustic pressure wave; and
   a mechanical insulating sleeve positioned to cover a portion of the first and second flexible circuits corresponding to the adhesive areas at which each transducer element is attached to the first and second flexible circuits;
   wherein the transducer elements form a linear array with the third surface of each transducer element in alignment within the mechanical insulating sleeve;
   wherein the first and second flexible circuits further include a base layer and a stiffener having greater rigidity than the base layer; and
   wherein the stiffener is aligned with only the adhesive areas at which each transducer element is attached to the first and second flexible circuits.

2. The sonar transducer array assembly of claim 1, wherein the mechanical insulating sleeve is positioned to align with the transducer linear array and thereby surround the first and opposing second surfaces of each transducer element.

3. The sonar transducer array assembly of claim 1, wherein the mechanical insulating sleeve contacts the second side of each of the first and second flexible circuits and a surface of the transducer elements positioned at opposing ends of the transducer array.

4. The sonar transducer array assembly of claim 1, further comprising an insulating material occupying the space between adjacent transducer elements.

5. The sonar transducer array assembly of claim 1, wherein the first and second surfaces of each transducer element are coated with a metal.

6. The sonar transducer array assembly of claim 1, wherein the first and second flexible circuits each include a plurality of conductively plated vias extending from the first side to the second side of the respective flexible circuit, and wherein each transducer element is electrically connected to one via on the first flexible circuit and one via on the second flexible circuit.

7. The sonar transducer array assembly of claim 6, wherein the vias are filled with electrically conductive paste to electrically connect the transducer elements to the vias.

8. The sonar transducer array assembly of claim 7, wherein at least one of the adhesive areas of each flexible circuit form a gasket to prevent the conductive paste from shorting adjacent electrical channels.

9. The sonar transducer array assembly of claim 1, wherein the base layer of the first and second flexible circuits is a flexible film including one or more conductive layers.

10. The sonar transducer array assembly of claim 1, wherein the stiffener is attached to the second side of the first and second flexible circuits and is positioned between the mechanical insulating sleeve and the first and second flexible circuits.

11. The sonar transducer array assembly of claim 1, wherein the stiffener has a greater rigidity than the rigidity of the base layer.

12. A method of manufacturing a sonar transducer array assembly, the method comprising the steps of:
attaching a first surface of a plurality of transducer elements to adhesive areas on a first flexible circuit so that the transducer elements form a transducer array;
attaching an opposing second surface of the transducer array to adhesive areas on a second flexible circuit;
electrically connecting the transducer array to the first flexible circuit and the second flexible circuit;
filling spaces between the transducer elements with an insulating material; and
placing a mechanical insulating sleeve on the assembly to cover a portion of the first and second flexible circuits corresponding to the adhesive areas at which each transducer element is attached to the first and second flexible circuits and to align with a third surface of each transducer element in the transducer array, the third surface of each transducer element configured to transmit and receive an acoustic pressure wave;
wherein the first and second flexible circuits further include a base layer and a stiffener having greater rigidity than the base layer; and
wherein the stiffener is aligned with only the adhesive areas at which each transducer element is attached to the first and second flexible circuits.

13. The method of claim 12, further comprising the step of applying adhesive to an array of rectangular areas positioned adjacent to one edge of the first flexible circuit with spaces therebetween to create the adhesive areas on a first side of the first flexible circuit before the transducer elements are attached to the first flexible circuit.

14. The method of claim 12, further comprising the step of applying adhesive to an array of rectangular areas positioned adjacent to one edge of the second flexible circuit with spaces therebetween to create the adhesive areas on a first side of the second flexible circuit before the second flexible circuit is attached to the transducer array.

15. The method of claim 12, further comprising the step of visually inspecting the transducer array before the second flexible circuit is attached.

16. The method of claim 12, further comprising the step of curing the assembly before filling the spaces between the transducer elements.

17. The method of claim 12, wherein the first flexible circuit includes a plurality of plated through holes, each positioned within one adhesive area and the second flexible circuit includes a plurality of plated through holes, each positioned within one adhesive area.

18. The method of claim 17, wherein the transducer array is electrically connected to the first flexible circuit and the second flexible circuit by filling the plated through holes of the first flexible circuit and the second flexible circuit with electrically conductive epoxy.

19. The method of claim 17, wherein the transducer array is electrically connected to the first flexible circuit and the second flexible circuit by soldering the transducer elements to the plated through holes of the first flexible circuit and the second flexible circuit.

20. The method of claim 12, wherein filling spaces between the transducer elements includes applying a urethane foam onto the transducer array.

21. The method of claim 12, wherein the base layer of the first and second flexible circuits is a flexible film including one or more conductive layers.

22. The method of claim 12, wherein the stiffener is attached to the second side of the first and second flexible circuits and is positioned between the mechanical insulating sleeve and the first and second flexible circuits.

23. The method of claim 12, wherein the stiffener has a greater rigidity than the rigidity of the base layer.

24. A sonar transducer array assembly manufactured by a method comprising the steps of:
attaching a plurality of transducer elements to an adhesive area on a first flexible circuit so that the transducer elements form a transducer array;
attaching the transducer array to an adhesive area on a second flexible circuit;
electrically connecting the transducer array to the first flexible circuit and the second flexible circuit;
filling spaces between the transducer elements with an insulating material; and
placing a mechanical insulating sleeve on the assembly to cover a portion of the first and second flexible circuits corresponding to the adhesive areas at which each transducer element is attached to the first and second flexible circuits and to align with a third surface of each transducer element in the transducer array, the third surface of each transducer element configured to transmit and receive an acoustic pressure wave;
wherein the first and second flexible circuits further include a base layer and a stiffener having greater rigidity than the base layer; and
wherein the stiffener is aligned with only the adhesive areas at which each transducer element is attached to the first and second flexible circuits.

25. The sonar transducer array assembly of claim 20, wherein the first flexible circuit includes a plurality of plated through holes, each positioned within one adhesive area and the second flexible circuit includes a plurality of plated through holes, each positioned within one adhesive area.

26. The sonar transducer array assembly of claim 24, wherein the transducer array is electrically connected to the first flexible circuit and the second flexible circuit by filling the plated through holes of the first flexible circuit and the second flexible circuit with electrically conductive epoxy.

27. The sonar transducer array assembly of claim 24, wherein the base layer of the first and second flexible circuits is a flexible film including one or more conductive layers.

28. The sonar transducer array assembly of claim 24, wherein the stiffener is attached to the second side of the first and second flexible circuits and is positioned between the mechanical insulating sleeve and the first and second flexible circuits.

29. The sonar transducer array assembly of claim 24, wherein the stiffener has a greater rigidity than the rigidity of the base layer.

\* \* \* \* \*